(12) United States Patent
Kim

(10) Patent No.: US 10,979,238 B2
(45) Date of Patent: Apr. 13, 2021

(54) SYSTEM AND METHOD FOR TRANSMITTING AND PROCESSING GROUP MESSAGE IN A STORE

(71) Applicant: HELLOFACTORY CO., LTD., Seoul (KR)

(72) Inventor: Kyungmin Kim, Seoul (KR)

(73) Assignee: HELLOFACTORY CO., LTD., Seoul (KR)

( * ) Notice: Subject to any disclaimer, the term of this patent is extended or adjusted under 35 U.S.C. 154(b) by 80 days.

(21) Appl. No.: 16/236,901

(22) Filed: Dec. 31, 2018

(65) Prior Publication Data

US 2019/0342109 A1   Nov. 7, 2019

Related U.S. Application Data

(63) Continuation of application No. PCT/KR2018/009621, filed on Aug. 21, 2018.

(30) Foreign Application Priority Data

May 4, 2018   (KR) .......................... 10-2018-0051956

(51) Int. Cl.
| | | |
|---|---|---|
| *H04L 12/18* | (2006.01) | |
| *H04W 4/12* | (2009.01) | |
| *H04L 12/58* | (2006.01) | |
| *H04W 4/08* | (2009.01) | |
| *H04W 76/40* | (2018.01) | |

(52) U.S. Cl.
CPC ........ *H04L 12/1845* (2013.01); *H04L 12/189* (2013.01); *H04L 51/04* (2013.01); *H04W 4/08* (2013.01); *H04W 4/12* (2013.01); *H04W 76/40* (2018.02)

(58) Field of Classification Search
CPC ... H04L 12/1845; H04L 12/189; H04L 51/04; H04W 76/40; H04W 4/08; H04W 4/12
See application file for complete search history.

(56) References Cited

U.S. PATENT DOCUMENTS

| | | | | |
|---|---|---|---|---|
| 6,973,437 | B1 * | 12/2005 | Olewicz ................. | G06Q 30/02 705/15 |
| 7,257,547 | B1 * | 8/2007 | Terase .................. | G06Q 10/087 705/15 |
| 8,224,700 | B2 * | 7/2012 | Silver .................... | G06Q 10/02 705/15 |
| 8,577,727 | B1 * | 11/2013 | Harrity .................. | G06Q 10/00 340/286.09 |
| 9,009,067 | B1 * | 4/2015 | Scotto ................ | G06Q 30/0207 705/15 |
| 10,096,011 | B2 * | 10/2018 | Camp .................... | G06Q 50/12 |

(Continued)

FOREIGN PATENT DOCUMENTS

| | | |
|---|---|---|
| KR | 10-2005-0039815 | 4/2005 |
| KR | 101032264 B1 * | 5/2011 |

*Primary Examiner* — Donald L Mills
(74) *Attorney, Agent, or Firm* — Ladas & Parry, LLP

(57) ABSTRACT

A system and method may transmit and process a group message in a store. For example, the system and method may transmit and process the group message in the store, in which tables in the store are set in a section unit, and a group message can be transmitted to one or more electronic devices of staff in charge of each section, thus to provide the best service to customers.

14 Claims, 11 Drawing Sheets

(56) References Cited

U.S. PATENT DOCUMENTS

| | | | |
|---|---|---|---|
| 2007/0136110 A1* | 6/2007 | Presley | G06Q 10/06 705/5 |
| 2010/0094715 A1* | 4/2010 | Kim | G06Q 30/02 705/15 |
| 2014/0195327 A1* | 7/2014 | Poskrobko | G06Q 50/12 705/14.39 |
| 2015/0012257 A1* | 1/2015 | Backholm | H04L 41/145 703/13 |
| 2015/0278926 A1* | 10/2015 | Fang | G06Q 30/0635 705/15 |
| 2017/0221072 A1* | 8/2017 | AthuluruTlrumala | G06F 3/0482 |
| 2018/0374322 A1* | 12/2018 | Kim | H04W 4/023 |

* cited by examiner

[FIG. 1]
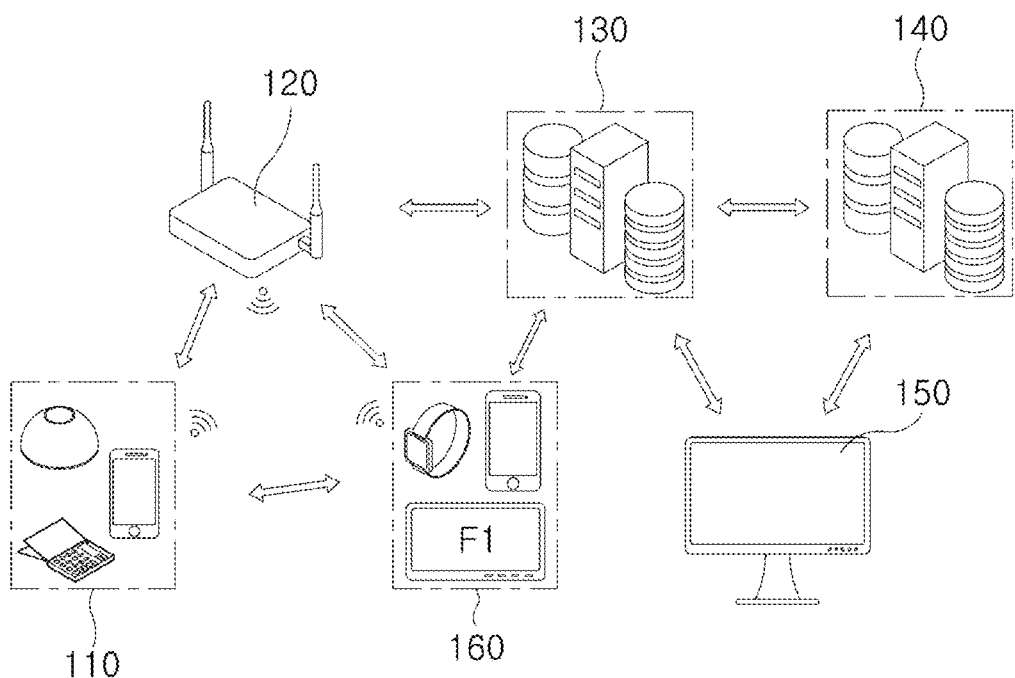

[FIG. 2]
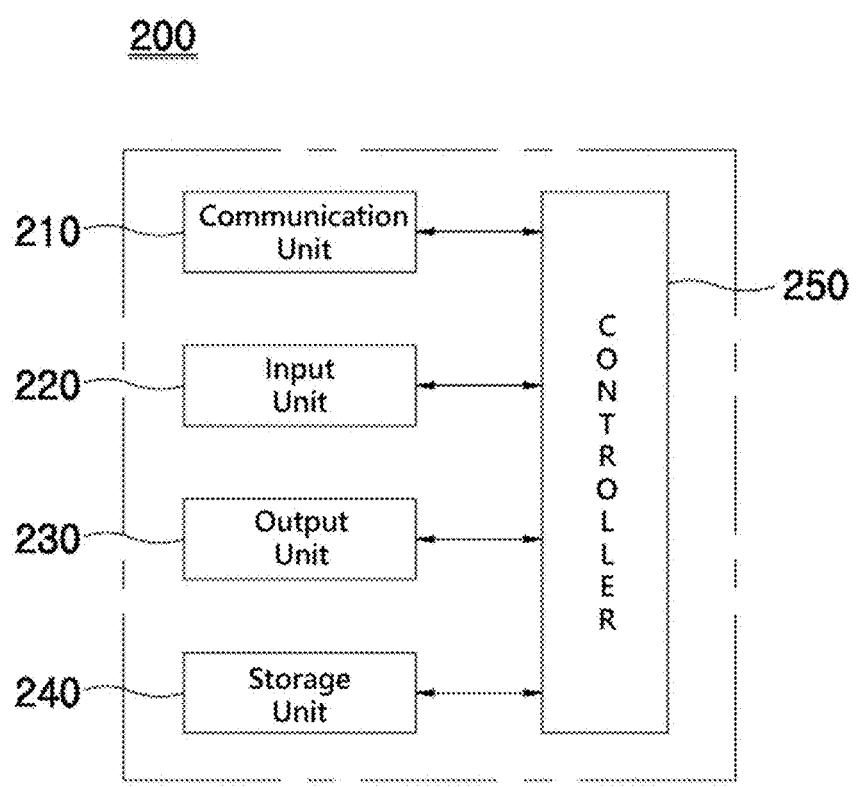

[FIG. 3]
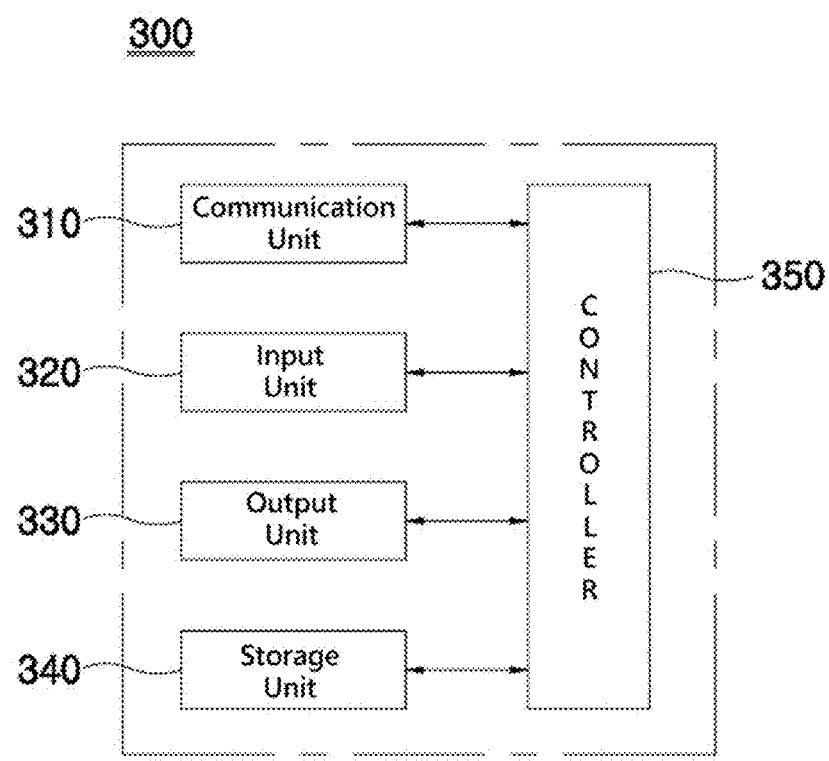

[FIG. 4]
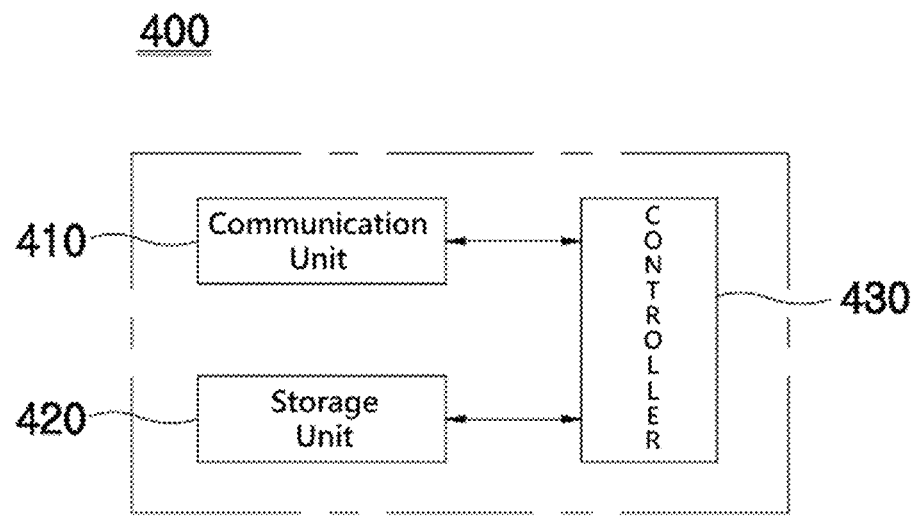
[FIG. 5]
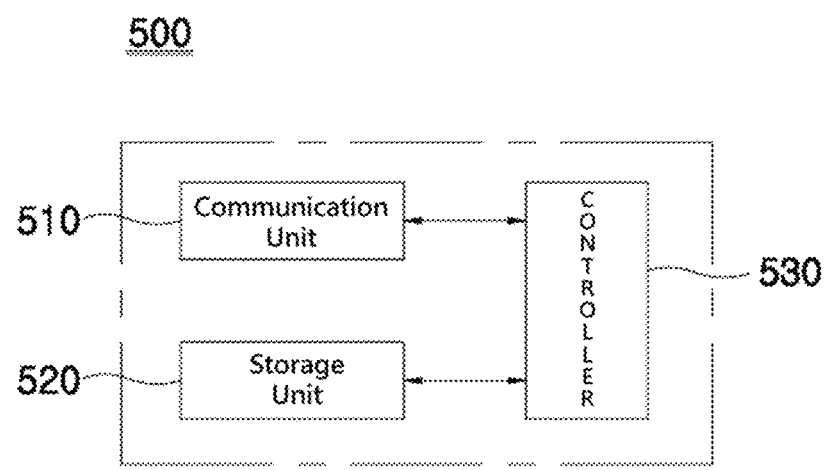

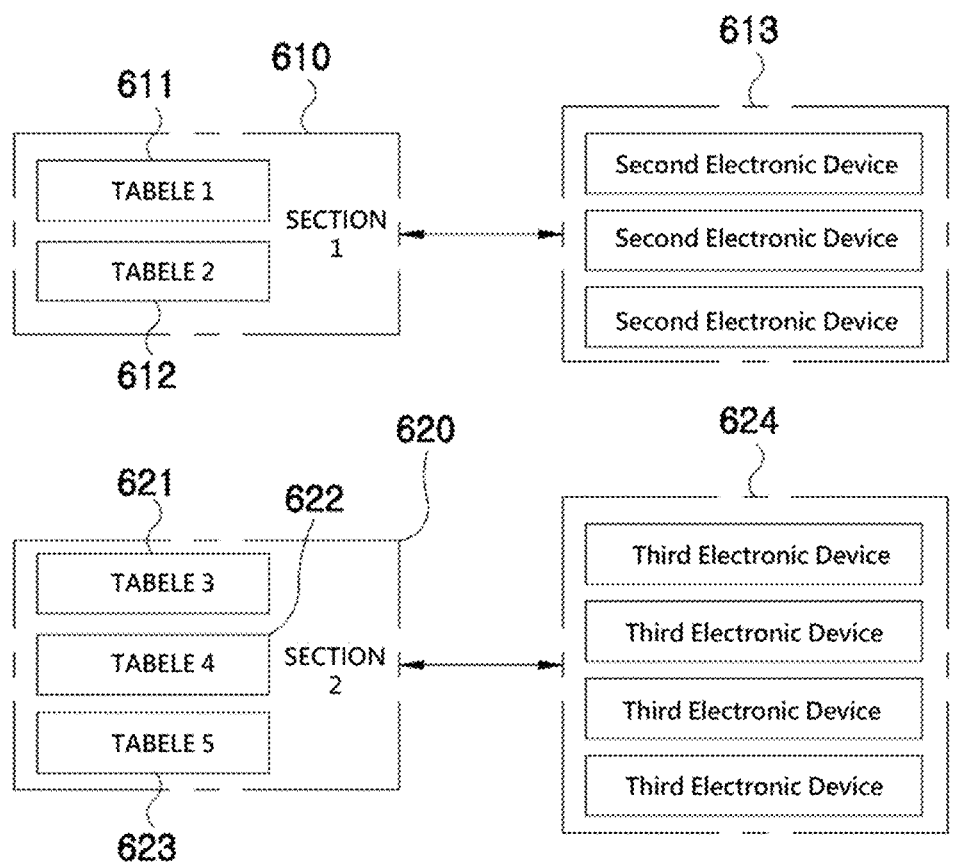
[FIG. 6]

[FIG. 7A]
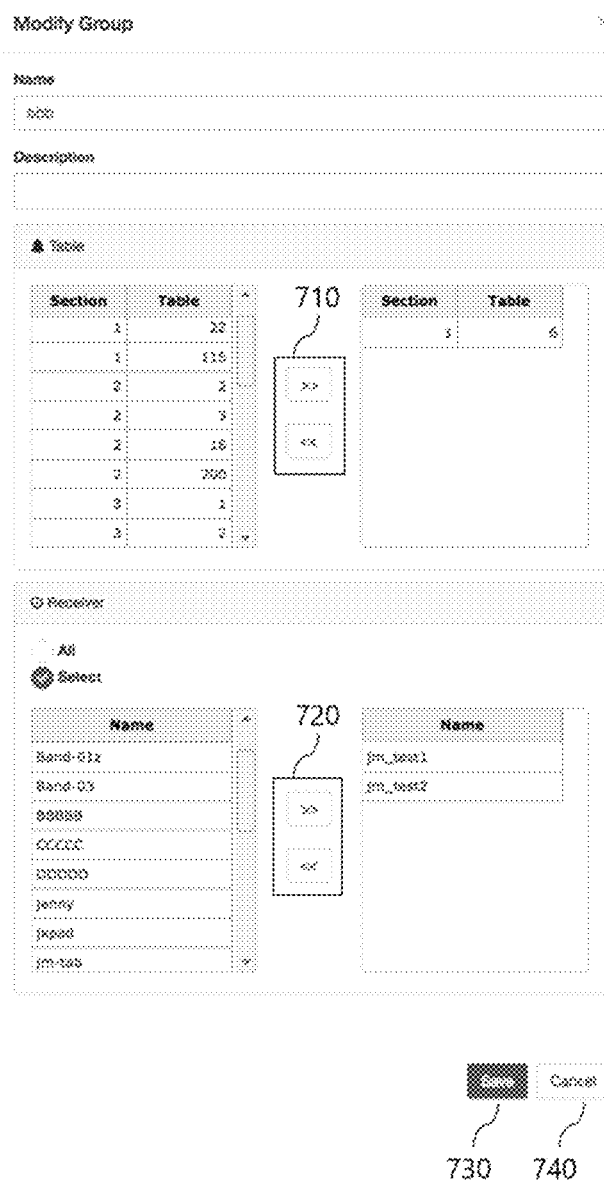

[FIG. 7B]
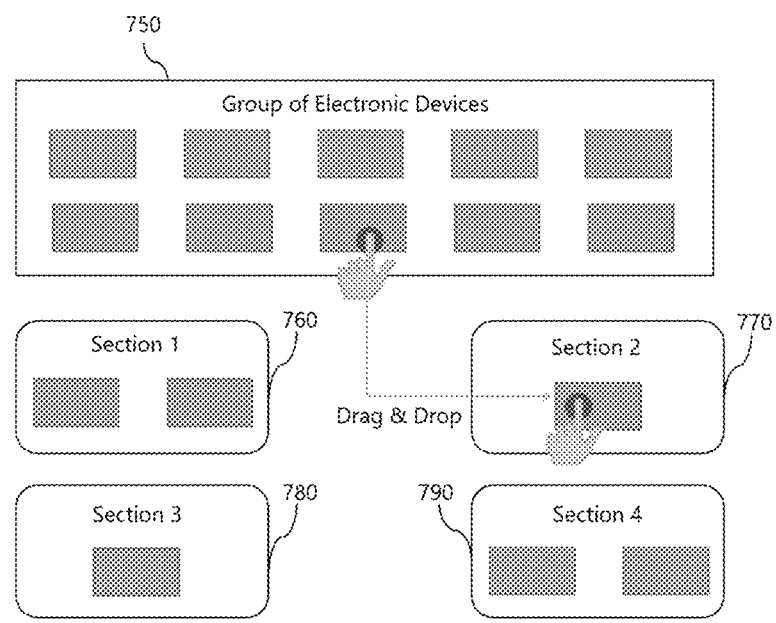

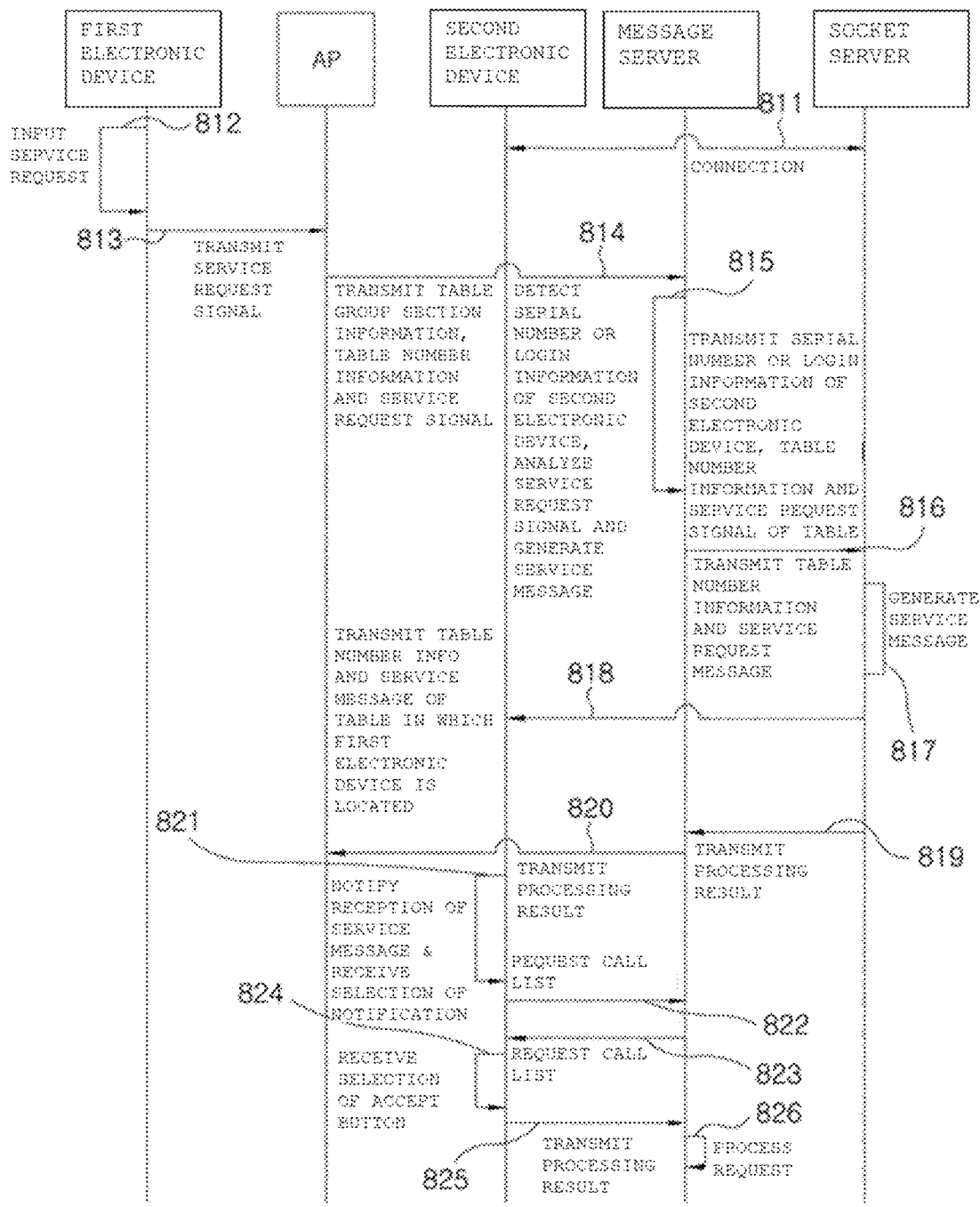
[FIG. 8A]

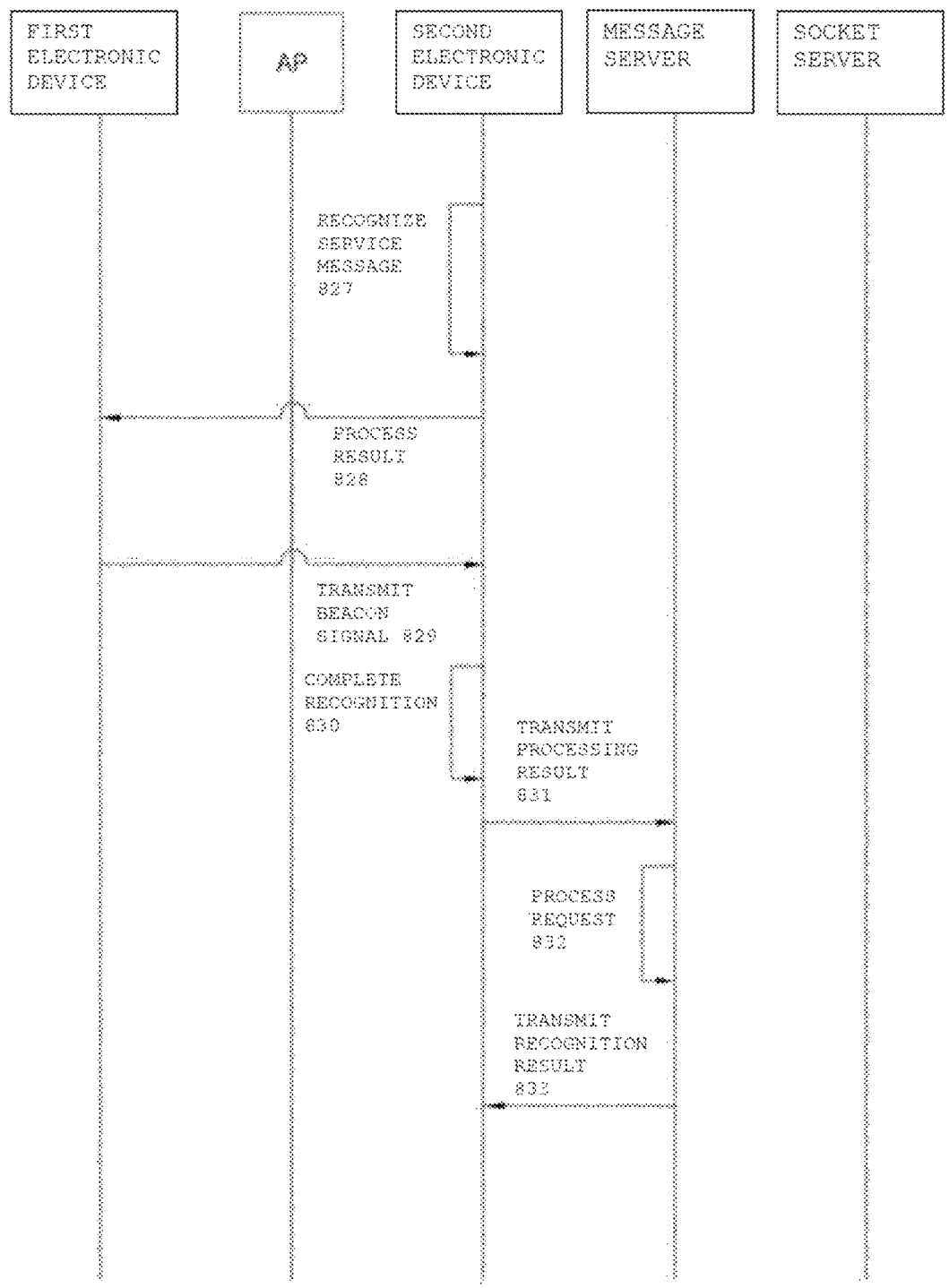
[FIG. 8B]

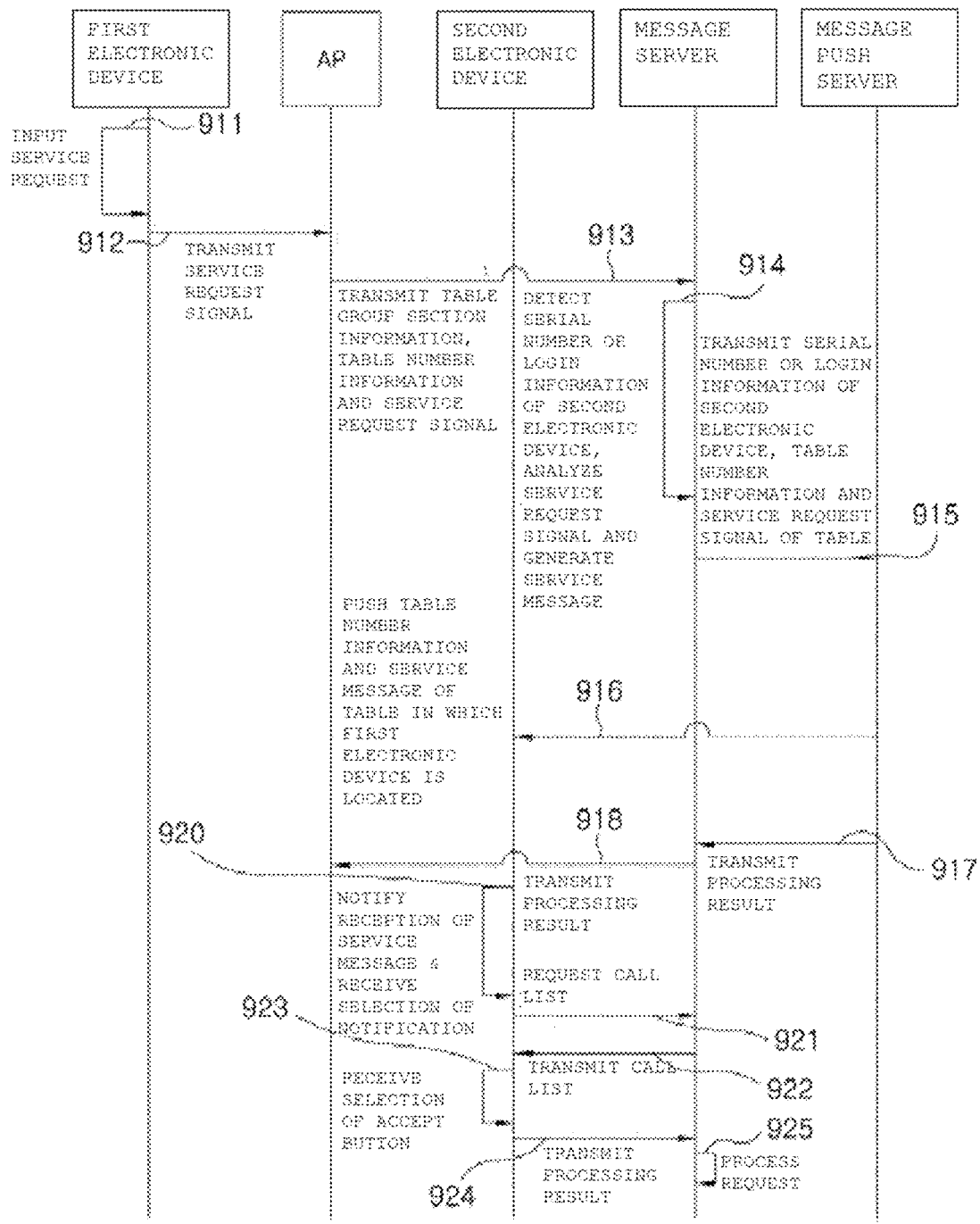
[FIG. 9A]

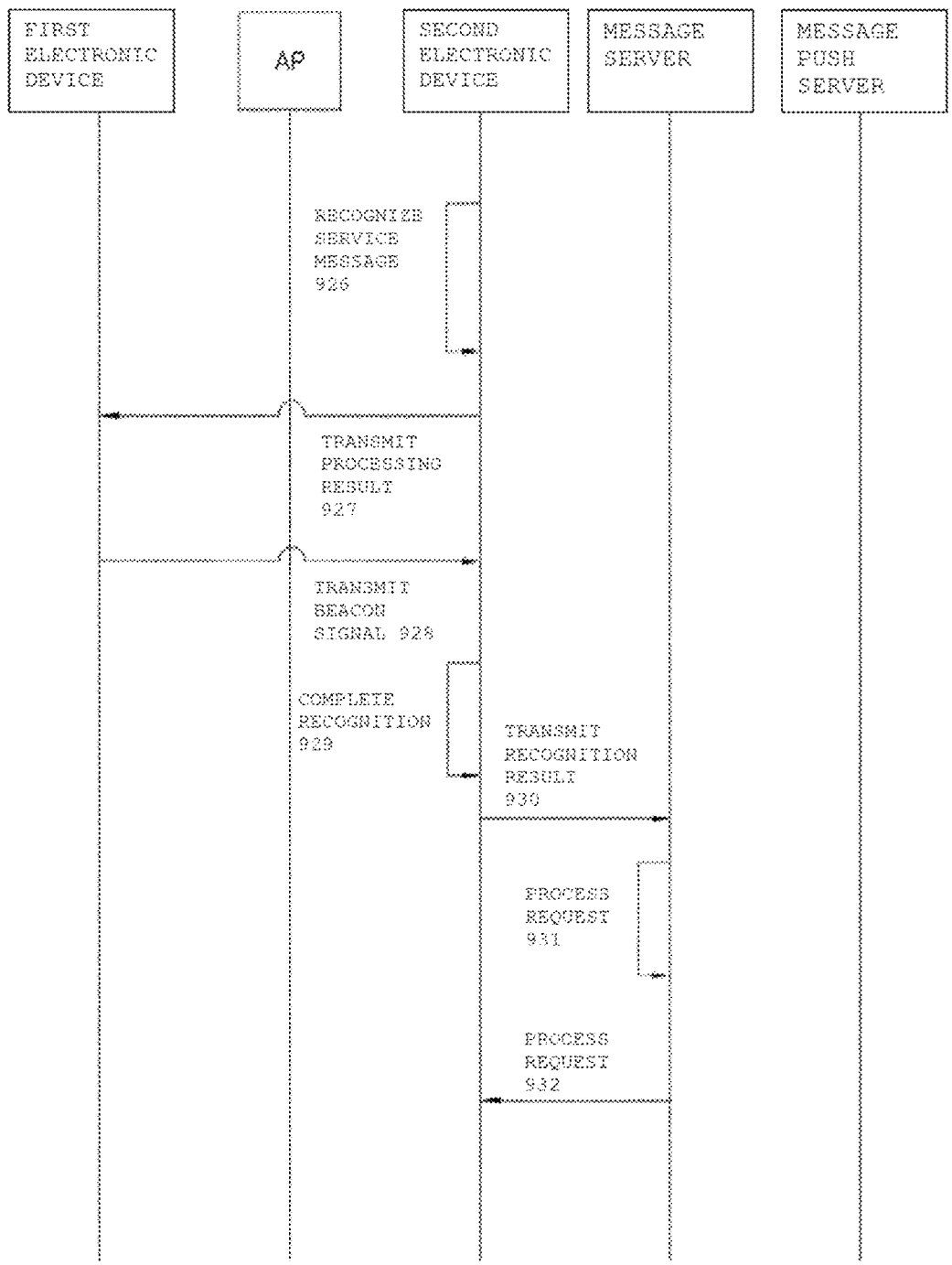
[FIG. 9B]

SYSTEM AND METHOD FOR TRANSMITTING AND PROCESSING GROUP MESSAGE IN A STORE

CROSS-REFERENCE TO RELATED APPLICATIONS

This application is a continuation of International Application No. PCT/KR2018/009621 filed on Aug. 21, 2018 claiming the priority to Korean Patent Application No. 10-2018-0051956, filed on May 4, 2018, which are incorporated herein by reference in their entireties.

TECHNICAL FIELD

Some embodiments of the present disclosure relate to a system and method for transmitting and processing a group message in a store, and more particularly, to a system and method for transmitting and processing a group message in a store, in which tables in the store are set in a section unit, and then a group message can be transmitted to electronic devices of staff in charge of each section, thus to provide the best service to customers.

RELATED ART

Due to characteristics of a service industry which should provide various services to customers, a service area is considered to be one of the important parts when the customers evaluate a store. Therefore, conventionally, a designated staff in charge of a table is deployed to provide a customized service to the customers in the store.

However, the conventional service providing method is sometimes inconvenient because the customer should directly call the staff, and when the number of staff in the store is limited, the customized service may not be provided to all customers.

Thereby, there is a need to develop a system and method that enable customers in the store to conveniently call the staff, as well as effectively respond to the customers with fewer staff.

RELATED ART DOCUMENT

[Patent Document 1] Method and device for managing order information using SMS (Korean Patent Application No. 10-2005-0028991), which is incorporated herein by reference in its entirety.

SUMMARY

Various embodiments of the present disclosure may provide a system and method for transmitting and processing a group message in a store, in which a plurality of tables in the store are grouped in a single section, respectively, as well as electronic devices carried by staff in the store are also grouped so that the staff are in charge of each section, thus to provide the best service to customers.

In addition, some embodiments of the present disclosure may provide a system and method for transmitting and processing a group message in a store, which may enhance a safety of customers by transmitting an urgent message in a group to electronic devices of all staff in the store when a service request of the customer is urgent.

Further, certain embodiments of the present disclosure may provide a system and method for transmitting and processing a group message in a store, which allow a staff who has responded first among staff who are in charge of a single section to a customer to perform a new service request, thereby providing the best service to the customer, and the staff may respond to the customer in an unhurried manner.

The objects of the present disclosure are not limited to the above-mentioned embodiments, and those skilled in the art will clearly understand other objects not described in the above from the following descriptions.

According to an aspect of the present disclosure, there is provided a system for transmitting and processing a group message in a store, including: a first electronic device configured to receive a service request from a customer who uses any one of a plurality of tables located in a store, and transmit a service request signal corresponding to the received service request to an access point (AP); the AP configured to receive the service request signal from the first electronic device, and transmit table group section information, table number information, and the received service request signal of a table in which the first electronic device is located; a message server configured to receive the table group section information, the table number information, and the service request signal from the AP, then analyze the service request signal to generate a service message corresponding to the service request signal, and transmit at least a part of serial number information of a second electronic device carried by at least one staff in charge of a table group section in which the first electronic device is located, login information of the second electronic device, the table number information, the service request signal and the service message of the table in which the first electronic device is located to an operation server; and the operation server configured to receive at least a part of the serial number information of the second electronic device, the login information of the second electronic device, the table number information, the service request signal and the service message of the table in which the first electronic device is located from the message server, and transmit the table number information and the service message to at least one second electronic device among the second electronic devices having the serial number information or login information, wherein the table group section information may be information including a plurality of sections in which the plurality of tables located in the store are divided into a single section having the number of tables set based on positions of the tables and the number of seats.

The message server may detect the serial number information or login information of the second electronic device carried by at least one staff in charge of the table group section in which the preset first electronic device is located.

The message server may detect the serial number information or login information of the second electronic device that has performed first another service request from another customer among the second electronic devices carried by at least one staff in charge of the table group section in which the first electronic device is located, and transmit at least three of the serial number information or login information of the detected second electronic device, the table number information, the service request signal and the service message of the table in which the first electronic device is located to the operation server, and the operation server may transmit the table number information and the service message of the table in which the first electronic device is located to the second electronic device that has performed first another service request from another customer.

If it is determined that there is one second electronic device carried by at least one staff in charge of the table group section in which the first electronic device is located, the message server may detect the serial number information or login information of the one second electronic device, and serial number information or login information of at least one third electronic device which is in charge of a preset section among the remaining sections other than the table group section in which the first electronic device is located, and transmit at least four of the serial number information or login information of the detected one second electronic device, the serial number information or login information of the third electronic device, and the table number information, service request signal and the service message of the table in which the first electronic device is located to the operation server, and if it is determined that the service message has failed to be transmitted as a result of transmitting the service message to the one second electronic device, the operation server may transmit the table number information and the service message of the table in which the first electronic device is located to at least one of a manager electronic device and the third electronic device.

The message server may detect the serial number information or login information of the second electronic device carried by at least one staff in charge of the table group section in which the first electronic device is located, and transmit at least a part of the serial number information or login information of the detected second electronic device, the table number information, the service request signal and the service message of the table in which the first electronic device is located to the operation server, and the operation server may transmit the table number information and the service message of the table in which the first electronic device is located to all the second electronic devices having the serial number information or login information.

By analyzing the received service request signal, if it is determined that the analyzed service request signal is a preset urgent message, the message server may request the operation server to transmit the table number information of the table in which the first electronic device is located, and simultaneously transmit the urgent message in a group to all the electronic devices carried by all the staff in the store, and the operation server receives a request to transmit the urgent message from the message server to all the electronic devices carried by all the staff in a group, thus to transmit the table number information and the urgent message of the table in which the first electronic device is located to all the electronic devices carried by all the staff in a group.

The operation server may include a socket server and a message push server, when the operation server is the socket server, the operation server may perform a pairing with the second electronic device, and receive the serial number information or login information of the second electronic device carried by at least one staff in charge of the table group section in which the first electronic device is located, the table number information and the service request signal of the table in which the first electronic device is located from the message server, and simultaneously receive a request to transmit the service message to the second electronic device, and generates the service message to transmit it to the second electronic device, when the operation server is the message push server, the operation server may receive the serial number information or login information of the second electronic device carried by at least one staff in charge of the table group section in which the first electronic device is located, the table number information and the service message of the table in which the first electronic device is located, and simultaneously may receive a request to push to the service message to the second electronic device, and push the service message received from the message server to the second electronic device.

The service message may include at least one message of a specific service request message, an inquiry message, a staff call message and an order message.

The first electronic device may include at least one of a call bell and an electronic menu, which are provided on each of the plurality of tables located in the store, and an electronic device of a customer who uses the table.

If it is determined that another second electronic device among the second electronic devices has confirmed a reception of the service message or an acceptance of a content of the service message, the second electronic device may change a state of the received service message to a preset state, or delete the service message from a call list including the requests of the customer.

If it is determined that an input of an acceptance button has been received by receiving the service message, the second electronic device may transmit a recognition signal indicating that the first electronic device has recognized to the first electronic device, and when receiving a response confirmation signal for the recognition signal from the first electronic device, transmit a service completion signal to the message server.

According to another aspect of the present disclosure, there is provided a method for transmitting and processing a group message in a store, including: by a first electronic device, receiving a service request from a customer who uses any one of a plurality of tables located in a store, and transmitting a service request signal corresponding to the received service request to an access point (AP); by the AP, receiving the service request signal from the first electronic device and transmitting table group section information, table number information and the received service request signal of a table in which the first electronic device is located to a message server; by the message server, receiving the table group section information, the table number information, and the service request signal of the table in which the first electronic device is located from the AP, then analyzing the service request signal to generate a service message corresponding to the service request signal, and transmitting at least a part of serial number information of a second electronic device carried by at least one staff in charge of a table group section in which the first electronic device is located, login information of the second electronic device, the table number information, the service request signal and the service message of the table in which the first electronic device is located to an operation server; and by the operation server, receiving at least a part of the serial number information of the second electronic device, the login information of the second electronic device, the table number information, the service request signal and the service message of the table in which the first electronic device is located from the message server, and transmitting the table number information and the service message to at least one second electronic device among the second electronic devices having the serial number information or login information, wherein the table group section information is information including a plurality of sections in which the plurality of tables located in the store are divided into a single section having the number of tables set based on positions of the tables and the number of seats.

According to some embodiments of the present disclosure, a system for processing a group message in a store, may comprise: a first electronic device associated with one of tables of the store and configured to receive a service request from a customer and to transmit a service request signal corresponding to the received service request to an access point (AP); the AP configured to receive the service request signal from the first electronic device and to transmit table group section information, table number information, and the received service request signal; a message server configured to receive the table group section information, the table number information, and the service request signal from the AP, to generate a service message corresponding to the service request signal, and to transmit to an operation server at least one of serial number information of one of second electronic devices associated with at least one staff in charge of a table group section including the one of tables associated with the first electronic device, login information of the one of second electronic device, the table number information, the service request signal and the service message of the one of tables associated with the first electronic device; and the operation server configured to receive, from the message server, at least one of the serial number information of the one of second electronic devices, the login information of the one of second electronic devices, the table number information, the service request signal and the service message of the one of tables associated with the first electronic device, and to transmit the table number information and the service message to at least one of the second electronic devices having the serial number information or login information.

The table group section information may comprise information related to a plurality of sections in which the tables of the store are grouped into the plurality of sections based on positions of the tables and the number of seats.

The message server may be configured to detect the serial number information or the login information of the one of second electronic devices associated with the at least one staff in charge of the table group section including the one of tables associated with the first electronic device.

The message server may be configured to detect serial number information or login information of another of the second electronic devices that has performed first another service request from another customer, and to transmit to the operation server at least three of the serial number information or the login information of the detected another second electronic device, the table number information, the service request signal and the service message of the one of tables associated with the first electronic device. The operation server may be configured to transmit the table number information and the service message of the one of tables associated with the first electronic device to the another of the second electronic devices that has performed the first another service request from the another customer. When there is one second electronic device among the second electronic devices in the table group section including the one of table associated with the first electronic device, the message server may be configured to detect serial number information or login information of the one second electronic device, and serial number information or login information of at least one third electronic device which is in charge of a preset section among remaining table group sections other than the table group section including the one of tables associated with the first electronic device, and to transmit to the operation server at least four of the serial number information or login information of the detected one second electronic device, the serial number information or login information of the third electronic device, and the table number information, service request signal and the service message of the one of tables associated with the first electronic device. When the service message has failed to be transmitted to the one second electronic device, the operation server may be configured to transmit the table number information and the service message of the one of tables associated with the first electronic device to at least one of a manager electronic device and the third electronic device.

The message server may be configured to: detect the serial number information or the login information of the one of second electronic devices associated with the at least one staff in charge of the table group section including the one of tables associated with the first electronic device, and transmit to the operation server at least one of the serial number information or the login information of the one of second electronic devices, the table number information, the service request signal and the service message of the one of tables associated with the first electronic device. The operation server may be configured to transmit the table number information and the service message of the one of tables associated with the first electronic device to the second electronic devices having the serial number information or the login information.

The message server may be configured to analyze the received service request signal, and when the analyzed service request signal is a preset urgent message, to request the operation server to transmit the table number information of the one of tables associated with the first electronic device and transmit the urgent message to the second electronic devices carried by staff of the store. The operation server may be configured to receive a request to transmit the urgent message from the message server to the second electronic devices carried by the staff, to transmit the table number information and the urgent message of the one of tables associated with the first electronic device to the second electronic devices carried by the staff of the store.

The operation server may comprise a socket server configured to perform a pairing with the one of second electronic devices, and to receive from the message server the serial number information or the login information of the one of second electronic devices associated with the at least one staff in charge of the table group section including the one of tables associated with the first electronic device, the table number information and the service request signal of the one of tables associated with the first electronic device and receive a request to transmit the service message to the one of second electronic devices, and generate and transmit the service message to the one of second electronic devices.

The operation server may comprise a message push server configured to receive the serial number information or the login information of the one of second electronic devices carried by the at least one staff in charge of the table group section including the one of tables associated with the first electronic device, the table number information and the service message of the one of tables associated with the first electronic device, and to receive a request to push to the service message to the one of second electronic devices, and to push the service message received from the message server to the one of second electronic devices.

The service message may comprise at least one message of a specific service request message, an inquiry message, a staff call message and an order message.

The first electronic device may comprise at least one of a call bell and an electronic menu, which are provided at each of the tables of the store, and a customer's own electronic device.

When another of the second electronic devices has confirmed a reception of the service message or an acceptance of the service message, the another of the second electronic devices is configured to change a state of the received service message to a preset state, or delete the service message from a call list including requests of the customer.

The one of second electronic devices is configured to: when an input of an acceptance button has been received by receiving the service message, transmit to the first electronic device a recognition signal indicating that the first electronic device has recognized, and when receiving a response confirmation signal for the recognition signal from the first electronic device, transmit a service completion signal to the message server.

According to certain embodiments of the present disclosure, a method for processing a group message in a store, may comprise: receiving, by a first electronic device, a service request from a customer associated with one of tables of the store, and transmitting, by the first electronic device, a service request signal corresponding to the received service request to an access point (AP); receiving, by the AP, the service request signal from the first electronic device and transmitting, by the AP, to a message server, table group section information, table number information and the received service request signal; receiving, by the message server, the table group section information, the table number information, and the service request signal from the AP, analyzing, by the AP, the service request signal to generate a service message corresponding to the service request signal, and transmitting, by the AP, to an operation server, at least one of serial number information of one of second electronic devices carried by at least one staff in charge of a table group section including the one of tables associated with the first electronic device, login information of the one of second electronic devices, the table number information, the service request signal and the service message of the one of tables associated with the first electronic device; and receiving, by the operation server, from the message server, at least one of the serial number information of the one of second electronic devices, the login information of the one of second electronic devices, the table number information, the service request signal and the service message of the one of tables associated with the first electronic device, and transmitting, by the operation server, the table number information and the service message to at least one of the second electronic devices having the serial number information or the login information. The table group section information may comprise information related to a plurality of sections in which the tables of the store are grouped into the plurality of sections based on positions of the tables and the number of seats.

Some embodiments of the present disclosure may provide a system and method for transmitting and processing a group message in a store, in which a plurality of tables in the store are grouped in a single section, respectively, as well as electronic devices carried by staff in the store are also grouped so that the staff are in charge of each section, thus to provide the best service to customers.

In addition, certain embodiments of the present disclosure may provide a system and method for transmitting and processing a group message in a store, which may enhance a safety of customers by transmitting an urgent message in a group to electronic devices of all staff in the store when a service request of the customer is urgent.

Further, some embodiments of the present disclosure may provide a system and method for transmitting and processing a group message in a store, which allow staff who has responded first among staff who are in charge of a single section to a customer to perform a new service request, thereby providing the best service to the customer, and the staff may respond to the customer in an unhurried manner.

The effects according to the present disclosure are not limited to the above exemplified descriptions, and more various effects are included in the disclosure of the present invention.

BRIEF DESCRIPTION OF DRAWINGS

FIG. 1 is a view for describing an overall system for transmitting and processing a group message in a store according to an embodiment of the present disclosure.

FIG. 2 is a block diagram illustrating a configuration of a first electronic device according to an embodiment of the present disclosure.

FIG. 3 is a block diagram schematically illustrating a configuration of a second electronic device according to an embodiment of the present disclosure.

FIG. 4 is a block diagram schematically illustrating a configuration of a message server according to an embodiment of the present disclosure.

FIG. 5 is a block diagram schematically illustrating a configuration of an operation server according to an embodiment of the present disclosure.

FIG. 6 is a block diagram for describing the second electronic device which is in charge of each section by dividing tables in a store into a plurality of sections according to an embodiment of the present disclosure.

FIGS. 7A and 7B are views for describing group management methods according to embodiments of the present disclosure.

FIGS. 8A and 8B are flowcharts for describing methods for transmitting and processing a group message in a store using a system, when an operation server is a socket server according to embodiments of the present disclosure.

FIGS. 9A and 9B are flowcharts for describing a method for transmitting and processing a group message in a store using a system, when an operation server is a message push server according to embodiments of the present disclosure.

DETAILED DESCRIPTION OF EMBODIMENTS

The above and other aspects, features, and advantages of the present invention will become apparent from the detailed description of the following embodiments in conjunction with the accompanying drawings. However, it should be understood that the present invention is not limited to the following embodiments and may be embodied in different ways, and that the embodiments are given to provide complete disclosure of the invention and thorough understanding of the present invention to those skilled in the art. The scope of the present invention is defined only by the claims.

It will be understood that each block of the flowchart illustrations and/or block diagrams, and combinations of blocks in the flowchart illustrations and/or block diagrams may be performed by algorithms or computer program instructions including firmware, software, or hardware. These algorithms or computer program instructions may be provided in a processor of a general purpose computer, a special purpose computer, or other programmable digital signal processing devices, such that the instructions, which may be executed by a processor of a computer or other programmable data processing device, generate means for performing the functions described in each block of the block diagram or each step of the flowchart. These algorithms or computer program instructions may also be stored in a computer usable or computer readable memory that can direct a computer or other programmable data processing devices to execute the functions in a particular manner, thereby it is also possible for the instructions stored in the computer usable or computer readable memory to produce commands including instruction means for performing the functions described in each block of the block diagram or each step of the flowchart. The computer program instructions may also be loaded onto a computer or other programmable data processing devices, such that a series of operating steps may be performed on the computer or other programmable data processing devices to create a process executed by the computer. Therefore, the instructions that direct he functions of the computer or other programmable data processing devices may be steps for executing the functions described in each block of the block diagram or each step of the flowchart.

In addition, each block of the block diagram or each step of the flowchart may represent a portion of each of a module, a segment, or a code, which includes one or more executable instructions for executing specified logical function(s). In addition, it should also be noted that in some alternative embodiments, the functions mentioned in the blocks of the block diagram or steps of the flowchart may occur out of order. For example, two blocks or steps illustrated in succession may be substantially performed at the same time, or the blocks or steps may sometimes be performed in reverse order according to the functions.

Like reference numerals refer to like elements throughout the specification.

Each of the features of various embodiments of the present invention may be merged or combined with each other partially or entirely, and as those skilled in the art will clearly understand, the embodiments may be operated in conjunction with each other and driven in various manners, and the respective embodiments may be embodied independently from each other, or may be embodied in relation to each other.

Hereinafter, various embodiments of the present invention will be described in detail with reference to the accompanying drawings.

FIG. 1 is a view for describing an overall system for transmitting and processing a group message in a store according to an embodiment of the present disclosure. First, as illustrated in FIG. 1, the system for transmitting and processing the group message in the store may include a first electronic device 110, an access point (AP) 120, a message server 130, an operation server 140, a manager electronic device 150, and a second electronic device 160.

The first electronic device 110 may include, for example, but not limited to, one or more of a call bell and an electronic menu, which can be disposed near or placed on one of a plurality of tables located in the store and an electronic device of a customer of the store, such as a customer who uses the electronic device in the store. For example, the first electronic device 110 may include any one of a variety of electronic devices such as a smart phone, a tablet PC, a laptop computer, a desktop computer and the like.

For example, the first electronic device 110 may transmit a service request signal input from a customer who uses the first electronic device 110, such as any one of the plurality of tables located in the store, to the AP 120.

Herein, the service request signal may be, for instance, but not limited to, a signal corresponding to a service request received from the customer who is present or near the store. For example, when a service request received from the customer is a service request for an order of a specific menu, the service request signal may be a signal corresponding to the order of the specific menu.

The AP 120 may receive the service request signal from the first electronic device 110 and transmit table group section information, table number information, and the service request signal of a table in which the first electronic device is located to the message server 130.

The AP 120 specifies the first electronic device 110 that transmitted the service request signal among the plurality of first electronic device 110. For instance, a specific frame of the service request signal received by the AP 120 from the first electronic device 110 may include table group section information, table number information, and the like of the table in which the first electronic device 110 is located.

Herein, the table group section information may be information including a plurality of sections in which the plurality of tables located in the store are divided into a single section having the number of tables set based on positions of the tables and the number of seats.

The table number information is unique number information set in the tables located in the store in advance or a preset table identifier assigned to each of the tables located in the store.

The message server 130 may be a server that is configured to reduce a burden on the operation server 140 so that the operational server 140 process web documents only, and may process a dynamic content and a web application program service by reading and processing a development language such as asp, php, jsp, and the like, for example.

For instance, after receiving the table group section information, the table number information, and the service request signal from the AP 120, the message server 130 may analyze the service request signal to generate a service message corresponding to the service request signal, and may transmit at least three of serial number information of the second electronic device 160 carried by at least one staff in charge of the table group section in which the first electronic device 110 is located, login information of the second electronic device 160, table number information, the service request signal and the service message of the table in which the first electronic device 110 is located to the operation server 140.

In an exemplary embodiment, when the operation server 140 is a socket server, the message server 130 may transmit the serial number information or login information of the second electronic device 160 carried by at least one staff in charge of the table group section in which the first electronic device 110 is located, the table number information and the service request signal of the table in which the first electronic device 110 is located to the operation server 140.

In another exemplary embodiment, if the operation server 140 is a message push server, the message server 130 may transmit the serial number information or login information of the second electronic device 160 carried by at least one staff in charge of the table group section in which the first electronic device 110 is located, the table number information and the service message of the table in which the first electronic device 110 is located to the operation server 140.

Herein, the serial number information is, for example, but not limited to, unique information that can identify the second electronic device 160 carried by at least one staff in charge of the table group section in which the first electronic device 110 is located.

In addition, the service message is, for instance, but not limited to, a message indicating a service requested by the customer such as a specific service request message, an inquiry message, a staff call message and an order message.

Further, the message server 130 may also detect the serial number information or login information of the second electronic device 160 carried by at least one staff in charge of the table group section in which the first electronic device 110 is located.

In addition, the message server 130 may detect the serial number information or login information of the second electronic device 160 that has performed first another service request from another customer among the second electronic devices 160 carried by at least one staff in charge of the table group section in which the first electronic device 110 is located, and transmit at least three of the serial number information or login information of the detected second electronic device 160, the table number information, the service request signal and the service message of the table in which the first electronic device 110 is located to the operation server 140.

In an exemplary embodiment, when the operation server 140 is the socket server, the message server 130 may transmit the serial number information or login information of the second electronic device 160 that has performed first another service request from another customer among the second electronic devices 160 carried by at least one staff in charge of the table group section in which the first electronic device 110 is located, the table number information and the service request signal of the table in which the first electronic device 110 is located to the operation server 140.

In another exemplary embodiment, when the operation server 140 is the message push server, the message server 130 may transmit the serial number information or login information of the second electronic device 160 that has performed first another service request from another customer among the second electronic devices 160 carried by at least one staff in charge of the table group section in which the first electronic device 110 is located, the table number information and the service message of the table in which the first electronic device 110 is located to the operation server 140.

In addition, if it is determined that there is one second electronic device 160 carried by at least one staff in charge of the table group section in which the first electronic device 110 is located, the message server 130 detects the serial number information or login information of one second electronic device 160, and the serial number information or login information of at least one third electronic device in charge of the preset table group section among the remaining table group sections other than the table group section in which the first electronic device 110 is located, and transmits at least four of the serial number information or login information of the detected one second electronic device 160, the serial number information or login information of the third electronic device, the table number information, the service request signal and the service message of the table in which the first electronic device 110 is located to the operation server 140.

In an exemplary embodiment, when the operation server 140 is the socket server, the message server 130 may transmit the serial number information or login information of the detected one second electronic device 160, the serial number information or login information of the third electronic device, the table number information and the service request signal of the table in which the first electronic device 110 is located to the operation server 140.

In another exemplary embodiment, when the operation server 140 is the message push server, the message server 130 may transmit the serial number information or login information of the detected one second electronic device 160, the serial number information or login information of the third electronic device, the table number information and the service message of the table in which the first electronic device 110 is located to the operation server 140.

In addition, by analyzing the received service request signal, when it is determined that the analyzed service request signal is a preset urgent message, the message server 130 may request the operation server 140 to transmit the table number information of the table in which the first electronic device 110 is located, and may simultaneously transmit the urgent message in a group to all the electronic devices carried by all staff in the store.

The operation server 140 may receive at least three of the serial number information or login information of the second electronic device 160, the table number information, the service request signal and the service message of the table in which the first electronic device 110 is located from the message server 130, and may transmit the table number information and the service message of the table in which the first electronic device is located to at least one second electronic device 160 among the second electronic devices 160 having the serial number or the login information, respectively.

In an exemplary embodiment, when the operation server 140 is the socket server, the operation server 140 may receive the serial number information or login information of the second electronic device 160, the table number information and the service request signal of the table in which the first electronic device 110 is located from the message server 130, then may generate a service message to transmit the table number information and the service message to at least one of the second electronic device 160 among the second electronic devices 160 having the serial number information or login information.

In another exemplary embodiment, when the operation server 140 is the message push server, the operation server 140 may receive the serial number information or login information of the second electronic device 160, the table number information and the service message of the table in which the first electronic device 110 is located from the message server 130, and may transmit the table number information and the service message of the table in which the first electronic device is located to at least one of the second electronic device 160 among the second electronic devices 160 having the serial number information or login information.

Herein, the operation server 140 may transmits the table number information and the service message of the table in which the first electronic device 110 is located to at least one of the second electronic device 160 among the second electronic devices 160 having the serial number information or login information. For example, the operation server 140 may transmit the table number information and the service message of the table in which the first electronic device 110 is located in a group to all the second electronic devices 160 having the serial number information or login information, and may transmit the table number information and the service message thereof to any one of the second electronic devices 160.

In addition, the operation server 140 may transmits the table number information and the service message of the table in which the first electronic device 110 is located to the second electronic device 160 that has performed first another service request from another customer.

Further, if it is determined that the service message has failed to be transmitted as a result of transmitting the service message to one second electronic device 160, the operation server 140 may transmits the table number information and the service message of the table in which the first electronic device 110 is located to any one device of the manager electronic device and the third electronic device.

In addition, the operation server 140 may transmit the table number information and the service message of the table in which the first electronic device 110 is located to all the second electronic devices 160 having the serial number information or login information.

Further, the operation server 140 may receive a request to transmit the urgent message from the message server 130 to all electronic devices carried by all staff in a group, thus to transmit the table number information and the urgent message in which the first electronic device 110 is located to all electronic devices carried by all staff in a group. In an exemplary embodiment, when the operation server 140 is the socket server, the operation server 140 may perform a pairing with the second electronic device 160, and receive the serial number information or login information of the second electronic device 160 carried by at least one staff in charge of the table group section in which the first electronic device 110 is located, the table number information and the service request signal of the table in which the first electronic device 110 is located from the message server 130, and may simultaneously receive a request to transmit the service message to the second electronic device 160, then may generate a service message to transmit it to the second electronic device 160.

In another exemplary embodiment, when the operation server 140 is the message push server, the operation server 140 may receive the serial number information or login information of the second electronic device 160 carried by at least one staff in charge of the table group section in which the first electronic device 110 is located, the table number information and the service message of the table in which the first electronic device 110 is located from the message server 130, and may simultaneously receive a request to push it to the second electronic device 160, then may push the service message received from the message server 130 to the second electronic device 160.

The manager electronic device 150 is, for example, but not limited to, an electronic device that manages electronic devices carried by the staff in the store. For example, the manager electronic device 150 may include any one of a variety of electronic devices such as a smart phone, a tablet PC, a laptop computer, and a desktop computer.

For instance, if the operation server 140 has failed to transmit the service message as a result of transmitting the service message to the second electronic device 160, the manager electronic device 150 may receive the table number information and the service message of the table in which the first electronic device 110 is located from the operation server 140.

The second electronic device 160 is, for instance, but not limited to, an electronic device carried by at least one staff in charge of the table group section in which the first electronic device 110 is located. For example, the second electronic device 160 may include any one of a variety of electronic devices such as a smart phone and a wearable device.

For example, the second electronic device 160 may receive the table number information and the service message of the table in which the first electronic device 110 is located from the operation server 140. Also, when the operation server 140 is the socket server, the second electronic device 160 may perform a pairing with the operation server 140.

In addition, if it is determined that another second electronic device 160 among the second electronic devices 160 has confirmed the reception of the service message or the acceptance of a content of the service message, the second electronic device 160 may change a state of the received service message to a preset state, or deletes the service message from a call list including the requests of the customer.

In one embodiment, the second electronic device 160 may transmit the received service message to another device. For example, if the second electronic device 160 cannot process the service received by a user thereof, the second electronic device 160 may transmit the service message to another device according to the selection of the user. As another example, if the service message is not received or accepted for a predetermined time, the second electronic device 160 may automatically transmit the service message to another device.

In one embodiment, the service message to be transmitted may include information indicating that the service message has been transmitted without being processed by another device. The device that has received the service message may request the user to preferentially process the service message.

In addition, the service message may include information on importance or priority thereof. For example, the service message having a higher importance task that needs to be processed faster may include information on a higher importance. In this case, the second electronic device 160 may sort and display the service messages in order of the importance in displaying the received service messages.

Further, since a service message that has consumed much time from receiving needs to be processed faster, the importance of each service message may be set so as to increase over time. Specific related operations of the second electronic device 160 will be described in detail below.

FIG. 2 is a block diagram illustrating a configuration of a first electronic device according to an embodiment of the present disclosure. First, as illustrated in FIG. 2, a first electronic device 200 may include a communication unit 210, an input unit 220, an output unit 230, a storage unit 240, and a controller 250.

The communication unit 210 may be configured to communicate with computers, servers, portable terminals and the like. The communication unit 210 may be, for example, but not limited to, a wireless or wired communication terminal. For instance, the communication unit 210 may transmit a service request signal corresponding to the service request received from the customer, who is the user of the first electronic device 200, to the AP 120.

The input unit 220 may be configured to provide an input interface to the user of the first electronic device 200. For example, the input unit 220 may be configured to receive various information from the user. For example, the input unit 220 may include one or more of a keyboard, a mouse, a touch device and the like. Alternatively, the input unit 220 may be formed integrally with the output unit 230. For instance, the input unit 220 and the output unit 230 may be formed integrally with each other in a form of a touch screen.

In an exemplary embodiment, the input unit 220 may receive a service request signal from the customer who is a user of the first electronic device 200. For example, when the input unit 220 is a call bell, a bell for requesting a specific service may be input. When the input unit 220 is an electronic menu, letters, symbols, shortcut keys and the like for requesting a specific service may be input. Further, when the input unit 220 is an electronic device of the customer who is the user, characters, symbols, and various order keys may be input.

The output unit 230 may include the input unit 220. The output unit 230 provides an output interface to the user. For example, the output unit 230 may be configured to display various screens while providing the output interface to the user, and may include a liquid crystal display, an organic light emitting display or the like.

The storage unit 240 may be configured to store various information according to a control of the controller 250. For example, the storage unit 240 may include memory and a computer readable medium.

The controller 250 performs various functions for the first electronic device 200 by executing various software programs, and performs processing and control for voice communication and data communication.

FIG. 3 is a block diagram schematically illustrating a configuration of a second electronic device according to an embodiment of the present invention. First, as illustrated in FIG. 3, a second electronic device 300 may include a communication unit 310, an input unit 320, an output unit 330, a storage unit 340 and a controller 350.

The communication unit 310 may communicate with computers, servers, or portable terminals. The communication unit 210 may be, for example, but not limited to, a wireless or wired communication terminal. For example, the communication unit 310 may receive the table number information and the service message of the table in which the first electronic device 110 is located from the operation server 140.

In addition, if it is determined that an input of an acceptance button has been received by receiving the service message, the communication unit 310 may transmit a recognition signal indicating that the first electronic device 110 has recognized to the first electronic device 110, and when receiving a response confirmation signal for the recognition signal from the first electronic device 110, the communication unit 310 may transmit a service completion signal to the message server 130.

The input unit 320 may provide an input interface to the user of the second electronic device 300. For example, the input unit 320 may be configured to receive various information from the user of the second electronic device 300, and may include a keyboard, a mouse, a touch device and the like. Alternatively, the input unit 320 may be integrally formed with the output unit 330. For example, the input unit 320 and the output unit 330 may be integrally formed in a form of a touch screen.

In an exemplary embodiment, the output unit 330 may include an input unit 320. The output unit 330 may provide an output interface to the user of the second electronic device 300. For example, the output unit 330 may be configured to display various screens or interfaces while providing the output interface to the user, and may include, for example, but not limited to, a liquid crystal display, an organic light emitting display and the like.

The storage unit 340 may be configured to stores various information according to the control of the controller 350. For example, the storage unit 340 may include memory and a computer readable medium.

The controller 350 executes various software programs to perform various functions for the second electronic device 300, and performs processing and control for voice communication and data communication.

For instance, when another second electronic device 300 among the second electronic devices 300 had confirmed the reception of the service message or has accepted the content of the service message, the controller 350 may change the state of the received service message to a preset state, or delete the service message from the call list including the requests of the customer.

FIG. 4 is a block diagram schematically illustrating a configuration of a message server according to an embodiment of the present invention. First, as illustrated in FIG. 4, the message server 400 may include a communication unit 410, a storage unit 420 and a controller 430.

First, the communication unit 410 may communicate with the computers, servers, or portable terminals. The communication unit 410 may be, for example, but not limited to, a wireless or wired communication terminal. For example, after receiving the table group section information, the table number information, and the service request signal from the AP 120, the communication unit 410 may transmit the serial number information or login information of the second electronic device 160 carried by at least one staff in charge of the table group section in which the first electronic device 110 is located, the table number information, the service request signal and the service message of the table in which the first electronic device 110 is located to the operation server 140.

Further, the communication unit 410 may transmit at least three of the serial number information or login information of the second electronic device 160 detected by the controller 430, the table number information, the service request signal and the service message of the table in which the first electronic device 110 is located to the operation server 140.

In addition, the communication unit 410 may transmit at least four of the serial number information or login information of one second electronic device detected by the controller 430, the serial number information or login information of the third electronic device, the table number information, the service request signal and the service message of the table in which the first electronic device 110 is located to the operation server 140.

In addition, if it is determined that the service request signal analyzed by the controller 430 is the preset urgent message, the communication unit 410 may request the operation server 140 to transmit the table number information of the table in which the first electronic device 110 is located, and simultaneously transmit the urgent message to all electronic devices carried by all staff in a group.

The storage unit 420 may be configured to store various types of information according to the control of the controller 430. For example, the storage unit 420 may include memory and a computer readable medium.

The controller 430 performs various functions for the message server 400 by executing various software programs, and performs processing and control for voice communication and data communication.

For example, the controller 430 may analyze the service request signal and generate a service message corresponding to the service request signal.

In addition, the controller 430 may detect the serial number information or login information of the second electronic device carried by at least one staff in charge of the table group section in which the preset first electronic device 110 is located.

Additionally, the controller 430 may detect the serial number information or login information of the second electronic device 160 that has performed first another service request from another customer among the second electronic devices 160 carried by at least one staff in charge of the table group section in which the first electronic device 110 is located.

In addition, if it is determined that there is one second electronic device 160 carried by at least one staff in charge of the table group section in which the first electronic device 110 is located, the controller 430 may detect the serial number information or login information of the one second electronic device, and the serial number information or login information of at least one third electronic device in charge of the preset table group section among the remaining table group sections other than the table group section in which the first electronic device is located.

In addition, the controller 430 may analyzes whether the received service request signal is a preset urgent message.

FIG. 5 is a block diagram schematically illustrating a configuration of an operation server according to an embodiment of the present disclosure. First, as illustrated in FIG. 5, an operation server 500 may include a communication unit 510, a storage unit 520 and a controller 530.

First, the communication unit 510 may communicate with the computers, servers, or portable terminals. The communication unit 510 may be, for example, but not limited to, a wireless or wired communication terminal. For example, the communication unit 510 may receive at least three of the serial number information or login information, the table number information, the service request signal and the service message of the second electronic device 160 from the message server 130, and may transmit at least one of the table number information and the service message to at least one second electronic device 160 among the second electronic devices 160 having the serial number information or login information.

In addition, the communication unit 510 may transmit the table number information and the service message of the table in which the first electronic device 110 is located to the second electronic device 160 that has performed first another service request from another customer.

Further, if it is determined that the service message has failed to be transmitted as a result of transmitting the service message to one second electronic device 160, the communication unit 510 may transmit the table number information and the service message of the table in which the first electronic device 110 is located to at least one of the manager electronic device 150 and the third electronic device.

Further, the communication unit 510 may transmit the table number information and the service message of the table in which the first electronic device 110 is located to all the second electronic devices 160 having the serial number information or login information.

In addition, the communication unit 510 may receive a request to transmit the urgent message from the message server to all electronic devices carried by all staff in a group, thus to transmit the table number information and the urgent message of the table in which the first electronic device 110 is located to all electronic devices carried by all staff in a group.

In an exemplary embodiment, when the operation server 500 is the socket server, the communication unit 510 may perform a pairing with the second electronic device 160, and may receive the serial number information or login information of the second electronic device 160 carried by at least one staff in charge of the table group section in which the first electronic device 110 is located, the table number information and the service request signal of the table in which the first electronic device 110 is located from the message server 130, and simultaneously receive a request to transmit the service message to the second electronic device 160, thus to transmit it to the second electronic device 160.

In another exemplary embodiment, when the operation server 500 is the message push server, the communication unit 510 may receive the serial number information or login information of the second electronic device 160 carried by at least one staff in charge of the table group section in which the first electronic device 110 is located, the table number information and the service message of the table in which the first electronic device 110 is located, and may simultaneously receive a request to push to the second electronic device 160, thus to push the service message received from the message server 130 to the second electronic device 160.

The storage unit 520 may be configured to store various information according to the control of the controller 530. For example, the storage unit 520 may include memory and a computer readable medium.

The controller 530 executes various software programs to perform various functions for the operation server 500, and performs processing and control for voice communication and data communication.

For example, when the operation server 500 is the socket server, the controller 530 may receive a request from the message server 130 to transmit the service message to the second electronic device 160, and generates a service message.

FIG. 6 is a block diagram for describing a second electronic device which is in charge of each section by dividing tables in a store into a plurality of sections according to an embodiment of the present disclosure.

First, as illustrated in FIG. 6, the table group section includes a plurality of sections in which the plurality of tables located in the store are divided into a single section having the number of tables set based on positions of the tables and the number of seats. Specifically, the sections are divided into a single section having the number of tables set based on the total number of seats of the tables located in the store, the position of each table, the number of staff working in the store, an operating time and the day of week and the like.

For example, a case, in which the total number of tables in a rectangular-shaped store is 28, wherein first to fourth tables capable of seating five customers are arranged in each of four corners, and a fifth table capable of seating eight customers is arranged in a center, will be described below.

First, in the above-described example, in weekday morning hours having a relatively small number of customers, the first and second tables may be set as a first section which is a single section, the third and fourth tables may be set as a second section which is another section, and the fifth table may be set as a third section which is the last section.

On the other hand, in the above-described example, in weekday evenings or weekends having a relatively large number of customers, the first to fifth tables may be set as the first to fifth sections, respectively.

In addition, the table sections may be set to be further subdivided when there are many staff working in the store, while setting of the table sections may be set not to be subdivided, when there are few staff working in the store.

For example, the setting of the table section may be a concept which can be changed based on the total number of seats of the tables located in the store, the position of each table, the number of staff working in the store, an operating time and the day of week and the like.

Also, the second electronic device may be a variety of electronic devices carried by at least one staff in charge of the table group section in which the first electronic device is located. For example, the staff in the store may provide the services to the customers with the second electronic device worn on a wrist in a form of a wearable device, respectively.

In an embodiment of the present disclosure, the plurality of tables in the store are grouped in a single section, respectively, as well as the second electronic devices carried by staff in the store are also grouped so that the staff are in charge of each section.

For example, as illustrated in FIG. 6, a case, in which the number of tables in the store is five, wherein a first table 611 and a second table 612 are set as a first section 610, and third to fifth tables 621, 622 and 623 are set as a second section 620, as well as a total of seven staff are in the store, and each staff provides the service to the customers with an electronic device worn on a wrist in a form of the wearable device, will be described below.

In the example described above, three second electronic devices 613 may be grouped to be in charge of the service of the customers in the first section 610, and four third electronic devices 624 may be grouped to be in charge of the service of the customers in the second section 620.

As described above, in the embodiment of the present disclosure, since the plurality of tables in the store are grouped in a single section, respectively, as well as the second electronic devices carried by staff in the store are also grouped so that the staff are in charge of each section, there is an advantage of being capable of providing the customers the customized service.

FIGS. 7A and 7B are views for describing a group management method according to embodiments of the present disclosure. First, FIG. 7A is a view for describing contents of managing the group in a method of moving a table list according to an embodiment of the present disclosure.

In a manager electronic device, the tables in the store may be grouped into a single section, respectively, and the number of staff and the staff in charge of each group may be specified.

For example, as illustrated in FIG. 7A, the manager electronic device may receive a command to perform a group modification from a manager, and may display a table window capable of performing the setting of sections for the tables in the store and a modification thereof, and a receiver window capable of performing the setting of staff in charge of each group and the modification thereof.

For example, the manager electronic device may receive a designation of the section and the table from the manager, and then may receive a selection of a shift key 710 to perform the setting of sections for the tables in the store and a modification thereof.

In addition, the manager electronic device may receive a designation of the staff from the manager, and then may receive the selection of a shift key 720 to perform the setting of staff in charge of a specific group and the modification thereof.

Thereafter, the manager electronic device may receive an input of a storage key 730 or a cancel key 740 according to the selection of the manager, and may store or cancel the input and modified contents, respectively.

FIG. 7B is a view for describing contents of managing the groups in a drag and drop method according to an embodiment of the present disclosure. In a manager electronic device, the tables in the store may be grouped into a single section, respectively, and the number of staff and the staff in charge of each group may be specified.

For example, as illustrated in FIG. 7B, the manager electronic device may receive a command to perform a group modification from a manager, and may display an entire electronic device 750 carried by an entire staff in the store and respective sections 760, 770, 780 and 790 in a user interface (UI) manner.

Thereafter, the manager electronic device may receive selection of one of the electronic devices 750 according to the selection of the manager, and drop the selected electronic device in a section region to be designated in the dragged state, then the selected electronic device may be grouped into the designated section.

According to some exemplary embodiments of the present disclosure, the manager may easily set and modify the section and the staff by using the shift key, or the drag and drop method, thus there may be an advantage of improving the convenience of the user.

FIGS. 8A and 8B are flowcharts for describing methods for transmitting and processing a group message in a store using a system, when a operation server is a socket server according to embodiments of the present disclosure. First, as illustrated in FIGS. 8A and 8B, the second electronic device performs a connection step (811) with the socket server. For example, when the second electronic device requests the connection to the socket server and then a store login step is completed by a specific staff, the socket server may verify the login information. Then, when the verification is completed, pairing between the second electronic device and the socket server may be completed to connect with each other.

Thereafter, at the step (812), the first electronic device may receive an input of a service request from the customer. For example, the first electronic device may receive an input of a service request from the customers, such as service requests, inquiries, calls and orders. At this time, the first electronic device may include a call bell and an electronic menu, which are placed on the table, and a customer's own electronic device.

At the step (813), the first electronic device may transmit a service request signal to the AP. For example, the first electronic device may convert the service request received from the customer who uses the table into a service request signal corresponding to the service request, and may transmit the converted service request signal to the AP.

At the step (814), the AP may transmit the table group section information, the table number information and the service request signal of the table in which the first electronic device is located to the message server. For example, a specific frame of the service request signal received from the first electronic device by the AP may include the table group section information and the table number information of the table in which the first electronic device is located. Thereby, the AP may transmit the table group section information, the table number information and the service request signal to the message server.

At the step (815), the message server may detect the serial number information or login information of the second electronic device and may analyze the service request signal to generate a service message. For instance, the message server may detect the serial number information or login information of the second electronic device in order to identify the electronic device of the staff in charge of the section to which the table of the customer who has input the service request belongs.

At the step (816), the message server may transmit the serial number information or login information of the second electronic device, the table number information and the service request signal of the table in which the first electronic device is located to the socket server. For instance, the message server may request the socket server to transmit the serial number information or login information of the second electronic device carried by at least one staff in charge of the table group section in which the first electronic device is located, the table number information and the service request signal of the table in which the first electronic device is located to the socket server, and simultaneously transmit the service message to the second electronic device.

If it is determined to be a preset urgent message as a result of analyzing the service request signal by the message server, the message server may request the socket server to transmit the table number information of the table in which the first electronic device is located, and simultaneously transmit the urgent message to the electronic devices carried by all the staff in the store in a group.

According to an embodiment of the present disclosure, when the service request of the customer is urgent, the message server may transmit the urgent message to the electronic devices of all staff in the store, such that there is an advantage that the safety of the customer may be improved and negligence may be prevented.

In the message server, if it is determined that there is one second electronic device carried by at least one staff in charge of the table group section in which the first electronic device is located, the message server may detect the serial number information or login information of the one second electronic device, and serial number information or login information of at least one third electronic device which is in charge of the preset section among the remaining sections other than the table group section in which the first electronic device is located. Then, the message server may transmit the serial number information or login information of the detected one second electronic device, the serial number information or login information of the third electronic device, and the table number information and the service message of the table in which the first electronic device is located to the socket server.

The reason is that, if it is determined that the service message has failed to be transmitted in the socket server later on as a result of transmitting the service message to the one second electronic device, the message server may transmit the table number information and the service message of the table in which the first electronic device is located to the manager electronic device and the third electronic device in charge of other sections.

According to an embodiment of the present disclosure, when there is only one staff in charge of one section, it may prepare for a case in which the service message cannot be transmitted due to a network problem, a power problem, and a staff who does not wear the electronic device, thereby achieving an advantage of improving the safety.

At the step (817), the socket server generates a service message. For example, the socket server may receive a request from the message server to transmit the service message to the second electronic device, and may generate a service message.

At the step (818), the socket server may transmit the table number information and the service message of the table in which the first electronic device is located to the second electronic device. At this time, the socket server may transmit the service messages to all the second electronic devices in charge of the section to which the first electronic device belongs, or may transmit the service message to any one of the second electronic devices.

For example, when the customer is a customer who needs for the staff to pay them particular attention, such as a VIP, elderly and the infirm, children, pregnant women, and disabled persons, the socket server may transmit the service message to all the second electronic devices in charge of the section to which the first electronic device belongs.

When the socket server receives a request to transmit an urgent message to all the electronic devices carried by the staff in a group from the message server, the socket server may transmit the urgent message to all the electronic devices carried by all the staff in a group.

On the other hand, when the socket server receives the serial number information or login information of the second electronic device that has performed first another service request from another customer among the second electronic devices from the message server, the socket server may transmit the table number information and the service message of the table in which the first electronic device is located only to the second electronic device that has performed first another service request from another customer.

According to an embodiment of the present disclosure, when the customer is a customer who needs to be paid particular attention, there is an advantage that the service message may be transmitted in a group to the electronic devices of all the staff in charge of the section, thereby providing a more particular service.

In addition, according to an embodiment of the present disclosure, since a service response time of the staff is considered by allowing a staff who has responded first to the customer among the staff who are in charge of one section to perform a new service request, there may be an advantage that the customer may receive the best service, and the staff may respond to the customer in an unhurried manner.

At the step (819), the socket server transmits a processing result to the message server, and then at the step (820) the message server receives the processing result from the socket server to transmit it to the AP.

At the step (821), the second electronic device may notify the staff, which is a user, of a reception of the service message, and then receives selection of the notification.

At the step (822), when at the step (822) the second electronic device may request a call list to the message server according to the selection of the staff who is the user, at the step (823) the message server may transmit the call list to the second electronic device. Herein, the call list may refer to, for example, but not limited to, a list in which various service requests received from the customers are recorded.

At the step (824), the second electronic device may receive selection of an accept button according to the selection of the staff who is the user. For instance, the second electronic device may receive the call list transmitted from the message server, and may receive selection of an accept button after displaying the call list.

Then, when at the step (825) the second electronic device transmits the processing result to the message server, at the step (826) the message server may process the request.

Thereafter, the second electronic device may recognize the service message at the step (827), and may transmit the processing result to the first electronic device at the step (828), then the first electronic device may transmit a beacon signal to the second electronic device at the step (829).

Thereafter, the second electronic device may complete the recognition at the step (830) and may transmit the recognition result to the message server at the step (831), then the message server may process the request at the step (832), and may transmit the processing result to the second electronic device at the step (833).

FIGS. 9A and 9B are flowcharts for describing methods for transmitting and processing a group message in a store using a system, when an operation server is a message push server according to embodiments of the present disclosure. First, as illustrated in FIGS. 9A and 9B, at the step (911), the first electronic device may receive an input of a service request from a customer. For example, the first electronic device may receive an input of a service request from customers, such as detailed service requests, inquiries, calls and orders. For instance, the first electronic device may include the call bell and the electronic menu, which are placed on the table, and the customer's own electronic device.

Thereafter, at the step (912), the first electronic device may transmit a service request signal to the AP. For example, the first electronic device may convert the service request received from the customer who uses the table into a service request signal corresponding to the service request, and may transmit the converted service request signal to the AP.

Then, at the step (913), the AP may transmit the table group section information, the table number information, and the service request signal to the message server. For instance, a specific frame of the service request signal received from the first electronic device by the AP may include the table group section information, and the table number information of the table in which the first electronic device is located. The AP may transmit the table group section information, the table number information, and the service request signal to the message server.

Thereafter, at the step (914), the message server may detect the serial number information or login information of the second electronic device, may analyze the service request signal, and may generate a service message. For example, the message server may detect the serial number information or login information of the second electronic device in order to identify the electronic device of the staff in charge of the section to which the table of the customer who input the service request belongs.

Thereafter, at the step (915), the message server may transmit the serial number information or login information of the second electronic device, the table number information and the service message of the table in which the first electronic device is located to the message push server. For example, the message server may request the message push server to transmit the serial number information or login information of the second electronic device carried by at least one staff in charge of the table group section in which the first electronic device is located, the table number information and the service message of the table in which the first electronic device is located, and may simultaneously push the service message to the second electronic device.

If it is determined to be a preset urgent message as a result of analyzing the service request signal by the message server, the message server may request the message push server to transmit the table number information of the table in which the first electronic device is located, and simultaneously transmit the urgent message to the electronic devices carried by all the staff in the store in a group.

If it is determined that there is one second electronic device carried by at least one staff in charge of the table group section in which the first electronic device is located, the message server may detect the serial number information or login information of the one second electronic device, and serial number information or login information of at least one third electronic device which is in charge of the preset section among the remaining sections other than the table group section in which the first electronic device is located.

Then, the message server may transmit the serial number information or login information of the detected one second electronic device, the serial number information or login information of the third electronic device, and the table number information and the service message of the table in which the first electronic device is located to the message push server.

The reason is that, if it is determined that the service message has failed to be transmitted in the message push server later on as a result of transmitting the service message to the one second electronic device, the message server may transmit the table number information and the service message of the table in which the first electronic device is located to the manager electronic device and the third electronic device in charge of other sections.

Then, at the step (916), a message push server may push the table number information and the service message of the table in which the first electronic device is located to the second electronic device. At this step, the message push server may transmit the service messages to all the second electronic devices in charge of the section to which the first electronic device belongs, or may transmit the service message to any one of the second electronic devices.

For example, when a customer needs for the staff to pay them particular attention, such as a VIP, elderly and the infirm, children, pregnant women, and disabled persons, the message push server may transmit the service message to all the second electronic devices in charge of the section to which the first electronic device belongs.

When the message push server receives a request to transmit an urgent message to all the electronic devices carried by the staff in a group from the message server, the message push server may transmit the urgent message to all the electronic devices carried by all the staff in a group.

On the other hand, when the message push server receives the serial number information or login information of the second electronic device that has performed first another service request from another customer among the second electronic devices from the message server, the message push server may transmit the table number information and the service message of the table in which the first electronic device is located only to the second electronic device that has performed first another service request from another customer.

Thereafter, at the step (917), the message push server may transmit a processing result to the message server, and then at the step (918) the message server may receive the processing result from the message push server to transmit it to the AP.

Substantially, at the step (920), the second electronic device may notify the staff, which is a user, of a reception of the service message, and then may receive a selection of the notification.

Thereafter, when the second electronic device requests a call list to the message server according to the selection of the staff who is the user at the step (921), the message server may transmit the call list to the second electronic device at the step (922).

Thereafter, at the step (923), the second electronic device may receive a selection of an accept button according to the selection of the staff who is the user. For instance, the second electronic device may receive the call list transmitted from the message server, and may receive a selection of an accept button after displaying the call list.

Then, when the second electronic device transmits the processing result to the message server at the step (924), the message server may process the request at the step (925).

Thereafter, the second electronic device may recognize the service message at the step (926), and may transmit the processing result to the first electronic device at the step (927), then the first electronic device may transmit a beacon signal to the second electronic device at the step (928).

Thereafter, the second electronic device may complete the recognition at the step (929), and may transmit the recognition result to the message server at the step (930), then the message server may process the request at the step (931), and may transmit the processing result to the second electronic device at the step (932).

According to some embodiments of the present disclosure, a method and system may transmit service request information received from each table to respective terminals in a store. However, the method and system according to embodiments of the present disclosure are not limited thereto, and embodiments of the present disclosure may also be applied to all methods and systems, which have a configuration for transmitting a request message from a specific position (corresponding to the 'table') or a specific subject (corresponding to the 'first electronic device') in a specific working space (corresponding to the 'store') to a person in charge of receiving (corresponding to the 'second electronic device') corresponding thereto.

In addition, each block of the block diagram or each step of the flowchart may represent a portion of each of a module, a segment, or a code, which includes one or more executable instructions for executing specified logical function(s). In addition, it should also be noted that in some alternative embodiments, the functions mentioned in the blocks of the block diagram or steps of the flowchart may occur out of order. For example, two blocks or steps illustrated in succession may be substantially performed at the same time, or the blocks or steps may sometimes be performed in reverse order according to the functions.

The steps of the method or algorithm described in connection with the embodiments disclosed herein may be directly embodied in a hardware or software module, or in a combination thereof executed by a processor. The software module may reside in a RAM memory, a flash memory, a ROM memory, an EPROM memory, an EEPROM memory, a register, a hard disk, a removable disk, a CD-ROM or any other form of a storage medium known in the art. An exemplary storage medium is coupled to the processor, and the processor may be capable of reading information from the storage medium, and writing information in the storage medium. Alternatively, the storage medium may be integrally formed with the processor. The processor and the storage medium may reside within an application specific integrated circuit (ASIC). The ASIC may reside within a user terminal. Alternatively, the processor and the storage medium may reside as an individual component in the user terminal.

While the embodiments of the present invention will be described in detail with reference to the accompanying drawings, the present invention is not limited to the above-described embodiments, and it will be understood by those skilled in the art that various modifications may be made without departing from the technical idea and characteristics of the invention. Accordingly, it should be understood that the embodiments disclosed in the present invention are only intended to describe the present invention, and the scope of the technical idea of the present invention is not limited by the above-described embodiments. Therefore, it should be understood that the embodiments described herein are only intended to illustrate the present invention and are not intended to limit the scope thereof in all aspects. The scope of the present invention to be protected should be interpreted by accompanying claims, and it should be interpreted that all technical scope within the equivalent scope thereto are included within the scope and spirit of the present invention.

The invention claimed is:

1. A system for processing a group message in a store, comprising:
    a first electronic device associated with one of tables of the store and configured to receive a service request from a customer and to transmit a service request signal corresponding to the received service request to an access point (AP);
    the AP configured to receive the service request signal from the first electronic device and to transmit table group section information, table number information, and the received service request signal;
    a message server configured to receive the table group section information, the table number information, and the service request signal from the AP, to generate a service message corresponding to the service request signal, and to transmit to an operation server at least one of serial number information of one of second electronic devices associated with at least one staff in charge of a table group section including the one of tables associated with the first electronic device, login information of the one of second electronic device, the table number information, the service request signal and the service message of the one of tables associated with the first electronic device; and
    the operation server configured to receive, from the message server, at least one of the serial number information of the one of second electronic devices, the login information of the one of second electronic devices, the table number information, the service request signal and the service message of the one of tables associated with the first electronic device, and to transmit the table number information and the service message to at least one of the second electronic devices having the serial number information or login information,
    wherein the table group section information comprises information related to a plurality of sections in which the tables of the store are grouped into the plurality of sections based on positions of the tables and the number of seats, and
    wherein, when there is one second electronic device among the second electronic devices in the table group section including the one of table associated with the first electronic device, the message server is configured to detect serial number information or login information of the one second electronic device, and serial number information or login information of at least one third electronic device which is in charge of a preset section among remaining table group sections other than the table group section including the one of tables associated with the first electronic device, and to transmit to the operation server at least four of the serial number information or login information of the detected one second electronic device, the serial number information or login information of the third electronic device, and the table number information, service request signal and the service message of the one of tables associated with the first electronic device.

2. The system according to claim 1, wherein the message server is configured to detect the serial number information or the login information of the one of second electronic devices associated with the at least one staff in charge of the table group section including the one of tables associated with the first electronic device.

3. The system according to claim 1, wherein the message server is configured to detect serial number information or login information of another of the second electronic devices that has performed another service request from another customer, and to transmit to the operation server at least three of the serial number information or the login information of the detected another second electronic device, the table number information, the service request signal and the service message of the one of tables associated with the first electronic device, and
the operation server is configured to transmit the table number information and the service message of the one of tables associated with the first electronic device to the another of the second electronic devices that has performed the first another service request from the another customer.

4. The system according to claim 1, wherein
when the service message has failed to be transmitted to the one second electronic device, the operation server is configured to transmit the table number information and the service message of the one of tables associated with the first electronic device to at least one of a manager electronic device and the third electronic device.

5. The system according to claim 1, wherein the message server is configured to:
detect the serial number information or the login information of the one of second electronic devices associated with the at least one staff in charge of the table group section including the one of tables associated with the first electronic device, and
transmit to the operation server at least one of the serial number information or the login information of the one of second electronic devices, the table number information, the service request signal and the service message of the one of tables associated with the first electronic device, and
the operation server is configured to transmit the table number information and the service message of the one of tables associated with the first electronic device to the second electronic devices having the serial number information or the login information.

6. The system according to claim 1, wherein the message server is configured to analyze the received service request signal, and when the analyzed service request signal is a preset urgent message, to request the operation server to transmit the table number information of the one of tables associated with the first electronic device and transmit the urgent message to the second electronic devices carried by staff of the store, and
the operation server is configured to receive a request to transmit the urgent message from the message server to the second electronic devices carried by the staff, to transmit the table number information and the urgent message of the one of tables associated with the first electronic device to the second electronic devices carried by the staff of the store.

7. The system according to claim 1, wherein the operation server comprises a socket server configured to perform a pairing with the one of second electronic devices, and to receive from the message server the serial number information or the login information of the one of second electronic devices associated with the at least one staff in charge of the table group section including the one of tables associated with the first electronic device, the table number information and the service request signal of the one of tables associated with the first electronic device and receive a request to transmit the service message to the one of second electronic devices, and generate and transmit the service message to the one of second electronic devices.

8. The system according to claim 1, wherein the operation server comprises a message push server configured to receive the serial number information or the login information of the one of second electronic devices carried by the at least one staff in charge of the table group section including the one of tables associated with the first electronic device, the table number information and the service message of the one of tables associated with the first electronic device, and to receive a request to push to the service message to the one of second electronic devices, and to push the service message received from the message server to the one of second electronic devices.

9. The system according to claim 1, wherein the service message comprises at least one message of a specific service request message, an inquiry message, a staff call message and an order message.

10. The system according to claim 1, wherein the first electronic device comprises at least one of a call bell and an electronic menu, which are provided at each of the tables of the store, and a customer's own electronic device.

11. The system according to claim 1, wherein when another of the second electronic devices has confirmed a reception of the service message or an acceptance of the service message, the another of the second electronic devices is configured to change a state of the received service message to a preset state, or delete the service message from a call list including requests of the customer.

12. The system according to claim 1, wherein the one of second electronic devices is configured to:
when an input of an acceptance button has been received by receiving the service message, transmit to the first electronic device a recognition signal indicating that the first electronic device has recognized, and
when receiving a response confirmation signal for the recognition signal from the first electronic device, transmit a service completion signal to the message server.

13. A method for processing a group message in a store, comprising:
receiving, by a first electronic device, a service request from a customer associated with one of tables of the store, and transmitting, by the first electronic device, a service request signal corresponding to the received service request to an access point (AP);
receiving, by the AP, the service request signal from the first electronic device and transmitting, by the AP, to a message server, table group section information, table number information and the received service request signal;
receiving, by the message server, the table group section information, the table number information, and the service request signal from the AP, analyzing, by the AP, the service request signal to generate a service message corresponding to the service request signal, and transmitting, by the AP, to an operation server, at least one of serial number information of one of second electronic devices carried by at least one staff in charge of a table group section including the one of tables associated with the first electronic device, login information of the one of second electronic devices, the table number information, the service request signal and the service message of the one of tables associated with the first electronic device;

receiving, by the operation server, from the message server, at least one of the serial number information of the one of second electronic devices, the login information of the one of second electronic devices, the table number information, the service request signal and the service message of the one of tables associated with the first electronic device, and transmitting, by the operation server, the table number information and the service message to at least one of the second electronic devices having the serial number information or the login information, wherein the table group section information comprises information related to a plurality of sections in which the tables of the store are grouped into the plurality of sections based on positions of the tables and the number of seats; and when there is one second electronic device among the second electronic devices in the table group section including the one of table associated with the first electronic device, detecting, by the message server, serial number information or login information of the one second electronic device, and serial number information or login information of at least one third electronic device which is in charge of a preset section among remaining table group sections other than the table group section including the one of tables associated with the first electronic device, and transmitting, by the message server, to the operation server at least four of the serial number information or login information of the detected one second electronic device, the serial number information or login information of the third electronic device, and the table number information, service request signal and the service message of the one of tables associated with the first electronic device.

14. The method according to claim 13, further comprising, when the service message has failed to be transmitted to the one second electronic device, transmitting, by the operation server, the table number information and the service message of the one of tables associated with the first electronic device to at least one of a manager electronic device and the third electronic device.

\* \* \* \* \*